United States Patent
Brada et al.

[19]

[11] Patent Number: 6,110,300
[45] Date of Patent: Aug. 29, 2000

[54] TOOL FOR GLASS MOLDING OPERATIONS AND METHOD OF MANUFACTURE THEREOF

[75] Inventors: Guy A. Brada, Chicago; Algirdas A. Underys, Arlington Hts.; Jesse Adamson, Chicago, all of Ill.

[73] Assignee: A. Finkl & Sons Co., Chicago, Ill.

[21] Appl. No.: 08/833,585

[22] Filed: Apr. 7, 1997

[51] Int. Cl.[7] .................... C22C 38/42; C22C 38/44; C21D 1/74
[52] U.S. Cl. ................ 148/325; 420/61; 75/512
[58] Field of Search .............. 420/61; 148/325; 75/512

[56] References Cited

U.S. PATENT DOCUMENTS

| | | | |
|---|---|---|---|
| 4,541,862 | 9/1985 | Finkl et al. ............................. | 75/12 |
| 4,600,427 | 7/1986 | Lenman et al. ........................ | 75/49 |
| 5,089,067 | 2/1992 | Schumacher .......................... | 148/325 |
| 5,232,120 | 8/1993 | Dunken et al. ........................ | 220/661 |
| 5,641,453 | 6/1997 | Hack et al. ............................ | 148/325 |

*Primary Examiner*—Deborah Yee
*Attorney, Agent, or Firm*—James G. Staples

[57] ABSTRACT

A tool for glass molding operations, particularly television tubes, having high oxidation resistance so that ice imperfections on a formed workpiece are eliminated or drastically reduced, said tool having the following approximate composition by weight percent: C 0.23–0.38, Mn 0.40–1.00, P 0.040 max, S 0.030 max, Si 0.00–1.20, Ni 1.0–3.0, Cr 14.0–20.0, Mo 0.25–1.00, V 0.10 max, Cu 0.50–1.50, Al 0.50–1.50, Fe balance together with incidental impurities and other elements not significantly adversely affecting performance and methods of manufacture thereof

6 Claims, 2 Drawing Sheets

TOOL FOR GLASS MOLDING OPERATIONS AND METHOD OF MANUFACTURE THEREOF

This invention relates generally to tools for glass molds and other tooling applications in which the tooling is subjected to corrosive and/or elevated temperature environments, including plastic molds and non-ferrous die casting applications, and methods of manufacture thereof. It relates specifically to tools which are exposed to oxidizing conditions during operations with a consequent undesirable degradation of the working surfaces thereof due to oxidation.

BACKGROUND OF THE INVENTION

There is a need for longer lived tools useable in oxidizing environments. Such tools are frequently required to maintain a high degree of polish during long production runs so that the workpiece, after removal from the tooling, has a smooth, blemish free surface. The glass industry, which is characterized by tight finish specifications, is a prime example of such an application, and the invention will be described in connection with this industry, though it will be understood that the invention has application to certain tooling applications in the plastic molding, non-ferrous die casting, and other corrosive environment and elevated temperature applications.

Specifically, in the glass industry, and particularly that portion of it devoted to the production of television tubes, there is a demand for mold materials which are resistant to oxidation when in contact with molten glass for long periods of time. This stems from the fact that after a glass television viewing screen has been formed, usually in a three part mold, at least one of the mold parts must be retracted to a part clearing position while in contact, at least briefly, with the formed screen; in other words, sliding contact occurs between the just formed workpiece, and at least one component of the multi-component mold. It will be understood that all components of the mold have a smooth, highly polished surface so that the formed screen will have no surface imperfections or irregularities which would result in a distortion of light transmitted through the screen. If any component of the multi-part mold, and particularly the retractable component which makes sliding contact with the just formed workpiece, has a rough surface, the surface of the just formed, but still deformable, part will reflect the surface discontinuity of the mold, and the formed part will be unacceptable. The oxidation which forms on the tool is sufficient, after a production run of a duration shorter than desired, to create a rough surface on the formed workpiece and subsequent rejection of the workpiece.

At the present time, the materials of choice for mold components in the glass industry are martensitic stainless steels. The 420 type has been the preferred choice for molds used in glass applications due to its strength and wear resistance properties in addition to oxidation and corrosion resistance.

Unfortunately, the oxidation and corrosion resistance of 420 type stainless steel is not sufficiently capable of withstanding the temperatures and oxidizing environment in the glass industry for extensive times. Because of these limitations, glass mold components manufactured from 420 type stainless steels must be periodically removed from service to remove the oxide build-up that forms on them over time.

SUMMARY OF THE INVENTION

The invention is a glass mold tool (or part, the term being used interchangeably herein), which meets the demanding requirement for glass mold components in terms of oxidation resistance, corrosion resistance, high strength and high wear resistance properties. In essence, the invention is a mold component in a three part mold assembly which includes a plunger, a bottom mold and a shell for use in a main assembly panel press which is formed from a high chromium, copper bearing, martensitic stainless steel alloy. The tool has good hot workability even though it contains a high level of chromium and, by current industry standards, a low level of nickel. It also has excellent corrosion resistance while maintaining the necessary strength and wear resistance properties and, most important of all, high oxidation resistance so that the mold components maintain their high polish over long production runs.

Specifically, the tool of this invention, which is a part (plunger, shell, bottom mold) of a mold assembly for television picture tubes, is formed from a high chromium, copper bearing, martensitic stainless steel alloy capable of achieving a high polish. The composition of the tool is based on thermodynamic phase stability, which allows a martensitic stainless steel with good hot workability to be developed in the presence of high chromium levels and low nickel levels. Typical high chromium martensitic stainless steels rely upon nickel to stabilize austenite to a degree which will allow the transformation of austenite to martensite. The tool of the invention has a relatively low nickel content but the austenite to martensite transformation is achieved by introducing copper and increasing the carbon content. The copper provides increased resistance to oxidation and corrosion as well as precipitation strengthening. Copper and nickel additions provide a wide austenite phase field which imparts good hot workability and allows martensitic transformation above room temperature. Additionally, the tool can achieve a high polish and resists softening better than 420 type stainless steels at elevated temperatures.

The tool is produced using electric arc furnace melting, vacuum arc degassing as exemplified by U.S. Pat. Nos. 3,501,289; 3,635,696; 4,069,039; 4,541,862; and 4,600,427, the disclosures of which are incorporated herein by reference, and wide die forging. The double vacuum process (U.S. Pat. No. 5,252,120), the disclosure of which is incorporated herein by reference, may be used to produce premium quality material for glass contact applications requiring a lens quality surface finish in the as-formed condition.

The tool will also be advantageous in tooling applications for plastic molds, non-ferrous die casting, and components subjected to corrosive and/or elevated temperature environments.

DESCRIPTION OF A SPECIFIC EMBODIMENT

Figure 1:
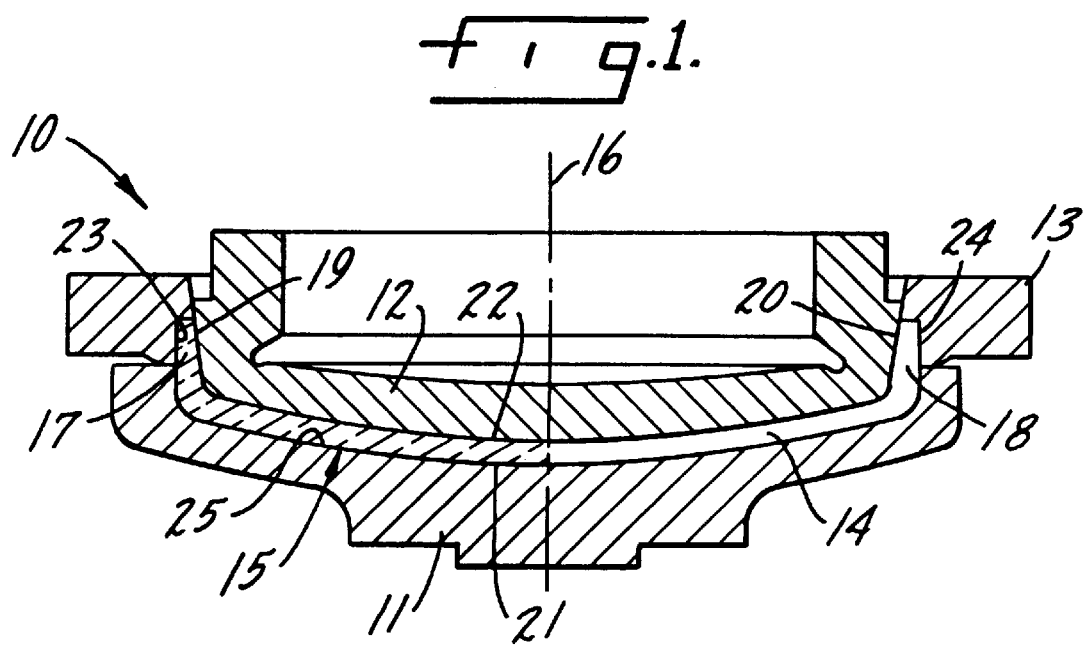
FIG. 1 is a section through a three part mold for high resolution picture tubes showing, on the left side, a section through a formed workpiece.

Referring now to the Figure, a tool, here a three part mold for high resolution television tubes, is indicated generally at 10. The tool, which is shown in cross section, consists of a bottom mold 11, a top mold or plunger 12, and a shell 13. The bottom mold, plunger and shell form a cavity 14 into which molten glass at a high temperature is placed, usually in gob form. Upon closure of the mold the soft, flowable glass is pressed into the configuration illustrated by the cavity 14 by conventional means. One half of the formed workpiece is indicated generally at 15.

After forming, including cooling to a point at which the workpiece is self-sustaining, the tool is opened and the workpiece ejected following which it is subjected to further processing. In this connection it will be noted that, during the ejection process, there is no sliding action between either (a) the plunger 12 or the bottom 11 on the one hand, and (b) the formed workpiece, since the direction of movement of the plunger 12 and bottom mold 11 lie along movement axis 16. Specifically, since the flanges 17 and 18 of the workpiece have rearwardly, outwardly tapering surfaces 19, 20, respectively, the first increment of movement of plunger 12 will separate said plunger from the workpiece. A similar taper, though not so pronounced, may be present on the outside surfaces of the flanges 17 and 18 near the corner between the flanges and the main outside viewing area 21 of the workpiece, and again there will be no significant sliding contact between the workpiece and bottom mold 11 after the first increment of relative movement between the mold and the workpiece. Any slight imperfections which may be present on the main outside viewing area 21 may be readily removed by a subsequent simple polishing operation. The main inside viewing area 22 is used as formed.

It will be noted however that when shell 13 is retracted from its illustrated position with respect to a formed workpiece, there will be a scraping or sliding action between the cavity forming area 23 on the shell and the outside surface 24 of flanges 17 and 18. Any imperfections on the shell 13 in the form of oxidation irregularities will be reflected on the outside surfaces 24 of the workpiece, usually in the form of a long scrape, or ridge, depending on the shape of the oxidation imperfection in the cavity forming area 23 of the shell.

It should also be noted that oxidation build-up on mold component surface 25 which forms the main outside viewing area 21 will result in discontinuities on the main outside viewing area 21. These discontinuities will require additional polishing to produce an acceptable picture tube.

It has been discovered that molding imperfections in flanges 17, 18 may be eliminated, or drastically reduced, by forming at least the shell from a special material, and thus the molding rejection rate from this cause eliminated or reduced to an acceptable level in high production runs. The special material is a stainless steel alloy having the following compositions in weight percent.

TABLE 1

| Broad chemistry range. x-maximum | | | | | | | | | | |
|---|---|---|---|---|---|---|---|---|---|---|
| C | Mn | P | S | Si | Ni | Cr | Mo | V | Cu | Al |
| 0.23/ 0.38 | 0.40/ 1.00 | 0.040x | 0.030x | 0.00/ 1.20 | 1.0/ 3.0 | 14.0/ 20.0 | 0.25/ 1.00 | .10x | 0.50/ 1.50 | 0.030x |

Alternatively, a preferred composition is as follows.

TABLE 2

| Preferred chemistry range, x-maximum | | | | | | | | | | |
|---|---|---|---|---|---|---|---|---|---|---|
| C | Mn | P | S | Si | Ni | Cr | Mo | V | Cu | Al |
| 0.28/ 0.35 | 0.40/ 0.60 | 0.030x | 0.010x | 0.20/ 0.50 | 1.50/ 1.80 | 14.0/ 18.0 | 0.35/ 0.55 | 0.02/ 0.08 | 0.85/ 1.15 | 0.02x |

Referring now to the foregoing compositions, the rationale for the development thereof is as follows.

Thermodynamic phase modeling was used along with experimentation to establish these ranges for the tool chemistry. Specifically, phase modeling was used to balance the ferrite stabilizing alloying elements (Cr, Si, and Mo) with the austenite stabilizers (C, Mn, Ni, and Cu) in order to provide a wide austenite phase field at forging and heat treatment processing temperatures while maintaining a chromium level of at least 14 w/o to enhance corrosion resistance. Other alloying constraints were imposed to optimize oxidation resistance, corrosion resistance, softening resistance at elevated temperatures, and good hot workability. Each element contributes to the overall capability of the tool. The effects of each element are detailed below.

Carbon determines the as quenched hardness, increases the tool's hardenabililty, and is a potent austenite stabilizer. Additionally, carbon combines with a number of different elements, such as Cr, Mo, V, Ti, Nb, and W, and forms a number of metal carbide phases. Metal carbide particles enhance wear resistance and the MC type metal carbide provides grain refinement through particle pinning. To ensure adequate metal carbide formation for wear resistance and grain refinement and to impart the necessary as quenched hardness, a minimum carbon content of 0.23 w/o is required. Increasing the carbon level above 0.38 w/o, however, is undesirable for three reasons. First, higher carbon levels produce an overabundance of carbide phase which reduces polishability of the tooling. Second, the precipitation of chromium carbides depletes the ferrite matrix of beneficial chromium which lowers the alloy's oxidation and corrosion resistance. Third, higher carbon levels will over-stabilize the austenite phase. Incomplete transformation can result from this since over-stabilizing austenite will depress the martensite start and finish temperatures below room temperature.

Manganese provides mild solid solution strengthening and increases the alloy's hardenability. If present in sufficient quantity, manganese binds sulfur into a non-metallic compound reducing the deleterious effects of free sulfur on the ductility of the tool material. Manganese is also an austenite stabilizer, and levels above 1.00 w/o can cause an overstabilization problem akin to that found with high carbon levels.

Silicon is used for de-oxidation during steel making. Additionally, silicon increases oxidation resistance, imparts a mild increase in strength due to solid solution strengthening, and increases the hardenability of the tool. Silicon mildly stabilizes ferrite, and silicon levels between 0.20 w/o and 0.50 w/o are desirable for de-oxidation and phase stabilization in the tool.

Nickel imparts minor solid solution strengthening, extends hardenability, and is a strong austenite stabilizer. Quantities between 1.00 w/o and 3.00 w/o will provide the wide austenite phase field for good hot workability while not suppressing the martensite transformation temperatures below acceptable limits.

Chromium moderately enhances hardenability, mildly strengthens by solid solution, and greatly improves wear resistance when combined with carbon to form metal carbide. When present in concentrations above 12 w/o, chromium offers high oxide and corrosion resistance. To provide greater oxide and corrosion resistance, a minimum of 14 w/o chromium is required. Up to 20 w/o can be added without reducing the stability of the austenite phase field to the extent that hot workability is compromised.

Molybdenum strongly improves the hardenability, increases corrosion resistance, reduces the propensity of temper embrittlement, and yields a strengthened tool when heated in the 1000°–1200° F. range by precipitation of fine metal carbide ($M_2C$). The molybdenum rich metal carbides provide increased wear resistance, improve hot hardness and resist coarsening below the $A_1$. Molybdenum quantities up to 1.00 w/o allow these benefits to be realized without compromising hot workability.

Copper augments the hardenability slightly, improves oxidation and corrosion resistance, and imparts strength through precipitation of copper rich particles. Copper levels between 0.50 w/o and 1.50 w/o allow gains in oxidation and corrosion resistance, as well as precipitation hardening, without significantly lowering the martensitic transformation temperature.

Aluminum effectively de-oxidizes when used during steel making and provides grain refinement when combined with nitrogen to form fine aluminum nitrides. Aluminum levels must be kept below 0.30 w/o to ensure preferential stream flow during ingot teeming.

Sulfur and phosphorous are not desired elements and are considered to be impurities. Sulfur greatly improves machinability, but at the cost of a decrease in polishability, ductility, and toughness. Due to the negative impact on polishability and toughness, sulfur levels are tolerated to a maximum of 0.010 w/o Phosphorous is similarly tolerated to levels of 0.030 w/o due to its tendency to decrease ductility by segregating to grain boundaries when tempering between 700° and 900° F.

Vanadium greatly extends the hardenability, and binds with carbon and nitrogen to produce a $M(C,N)$ type carbonitride. Vanadium carbo-nitrides refine the grain size by pinning grain boundaries and impart strengthening when precipitated out in the 1000° to 1200° F. range.

A trial heat was melted to the chemistry listed in Table 3. During teeming of the first trial heat, poor stream fluidity prevented complete filling of the ingots.

TABLE 3

Chemistry of heat no. 260664

| C | Mn | P | S | Si | Ni | Cr | Mo | V | Cu | Al |
|---|---|---|---|---|---|---|---|---|---|---|
| 0.35 | 0.51 | 0.023 | 0.006 | 0.34 | 2.08 | 15.27 | 0.44 | 0.05 | 0.87 | 0.035 |

Material for a hardenability test was salvaged from the short poured ingots, and is presented in Table 4. Hardenability defines the depth to which a bar can be hardened, and is typically measured by hardness as a function of depth beneath the quenched surface. In this case, hardenability was measured in accordance with ASTM A255 by the standard end quench test method.

TABLE 4

End quench test data for heat no. 260664

| 'J' distance (sixteenths of an inch) | Hardness (Rockwell, C scale) | 'J' distance (sixteenths of an inch) | Hardness (Rockwell, C scale) |
|---|---|---|---|
| 1 | 51 | 13 | 49 |
| 2 | 50 | 14 | 49 |
| 3 | 50 | 15 | 49 |
| 4 | 50 | 16 | 49 |
| 5 | 50 | 18 | 49 |

TABLE 4-continued

End quench test data for heat no. 260664

| 'J' distance (sixteenths of an inch) | Hardness (Rockwell, C scale) | 'J' distance (sixteenths of an inch) | Hardness (Rockwell, C scale) |
| --- | --- | --- | --- |
| 6 | 50 | 20 | 49 |
| 7 | 50 | 22 | 48 |
| 8 | 49 | 24 | 48 |
| 9 | 49 | 26 | 48 |
| 10 | 49 | 28 | 48 |
| 11 | 49 | 30 | 48 |
| 12 | 49 | 32 | 48 |

Another heat was melted to the chemistry listed in Table 5. The aluminum content was reduced to 0.020 weight percent (w/o) maximum to improve stream flow during ingot teeming. Modifying the original aluminum content successfully solved the fluidity problem, and this heat was teemed without difficulty into four 31 inch 0×159 inch long ingots.

TABLE 5

Chemistry of heat no. 260686

| C | Mn | P | S | Si | Ni | Cr | Mo | V | Cu | Al |
| --- | --- | --- | --- | --- | --- | --- | --- | --- | --- | --- |
| 0.37 | 0.55 | 0.024 | 0.006 | 0.43 | 1.96 | 15.70 | 0.44 | 0.05 | 0.98 | 0.018 |

The ingots were converted via. wide die forging into 3×24×100 inch plates for glass panel ring mold stock. The plates were spheroidized by way of a quench and double temper scheme listed in Table 6 to 300 Brinell hardness number (BHN).

TABLE 6

Spheroidization treatment

| Step no. | Process | Temperature (° F.) | Time (hr) |
| --- | --- | --- | --- |
| 1 | Normalize (air cool) | 1850 | 20 |
| 2 | Temper (air cool) | 1200 | 20 |
| 3 | Temper (air cool) | 1300 | 20 |

Material was removed from two plates for mechanical testing and microstructural evaluation. Hardenability, temper response, softening resistance, and tensile data were collected using this material.

Hardenability data is listed in Table 7. Again, hardenability was measured in accordance with ASTM A255 by the standard end quench test method.

TABLE 7

End quench test data for heat no. 260686

| 'J' distance (sixteenths of an inch) | Hardness (Rockwell, C scale) | 'J' distance (sixteenths of an inch) | Hardness (Rockwell, C scale) |
| --- | --- | --- | --- |
| 1 | 50 | 13 | 47 |
| 2 | 49 | 14 | 46 |
| 3 | 48 | 15 | 46 |
| 4 | 48 | 16 | 46 |
| 5 | 48 | 18 | 45 |
| 6 | 48 | 20 | 45 |
| 7 | 48 | 22 | 45 |
| 8 | 48 | 24 | 45 |
| 9 | 47 | 26 | 45 |
| 10 | 47 | 28 | 44 |
| 11 | 47 | 30 | 44 |
| 12 | 47 | 32 | 44 |

The temper response was established through isochronal hardness vs. temperature data, presented graphically in FIG. 1 and listed in Table 8. The experiment established both the maximum hardness capability of the tool and the effects of tempering on hardness. The data were generated by water quenching one inch cubes of the tool material from 1850° F. and then tempering each one at a selected temperature below the $A_{1c}$ for a time of four hours. Hardness measurements were taken after the samples were cooled to room temperature.

TABLE 8

Isochronal hardness vs. tempering temperature data for water quenched heat 260686

| Tempering Temperature (° F.) | Hardness (Brinell hardness number, 3006 kg load) |
|---|---|
| As Quenched | 522 |
| 700 | 503 |
| 800 | 507 |
| 900 | 499 |
| 1000 | 375 |
| 1100 | 321 |
| 1200 | 293 |
| 1300 | 298 |
| 1350 | 323 |
| 1400 | 335 |

Figure 2:
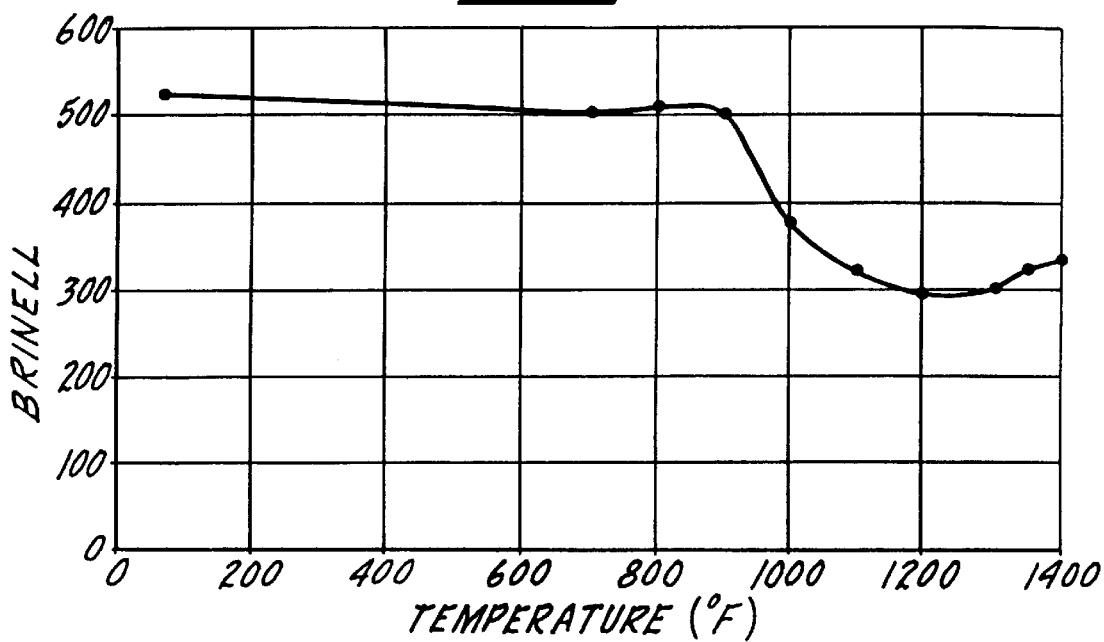
FIG. 2 is a temper response graph.

A four hour isochronal hardness vs. tempering temperature graphs for water quenched heat 260686 austenized at 1850° F. is illustrated in FIG. 2 to which attention is now directed.

The softening resistance was determined by constructing an isothermal hardness vs. time curve which is presented graphically in FIG. 2 and listed in Table 9. A temperature of 1300° F. was selected since this temperature lies near the $A_{1c}$ of the tool, calculated to be 1325° F., where softening conditions are most pronounced. The isothermal curve shows that the quenched condition resists softening at 1300° F. even after 25 hours.

TABLE 9

Isothermal hardness vs. time data at 1300° F. for water quenched heat 260686

| Time (hours) | Hardness (Brinell hardness number) |
|---|---|
| 2 | 290 |
| 4 | 298 |
| 8 | 304 |
| 16 | 293 |
| 24 | 293 |

Figure 3:
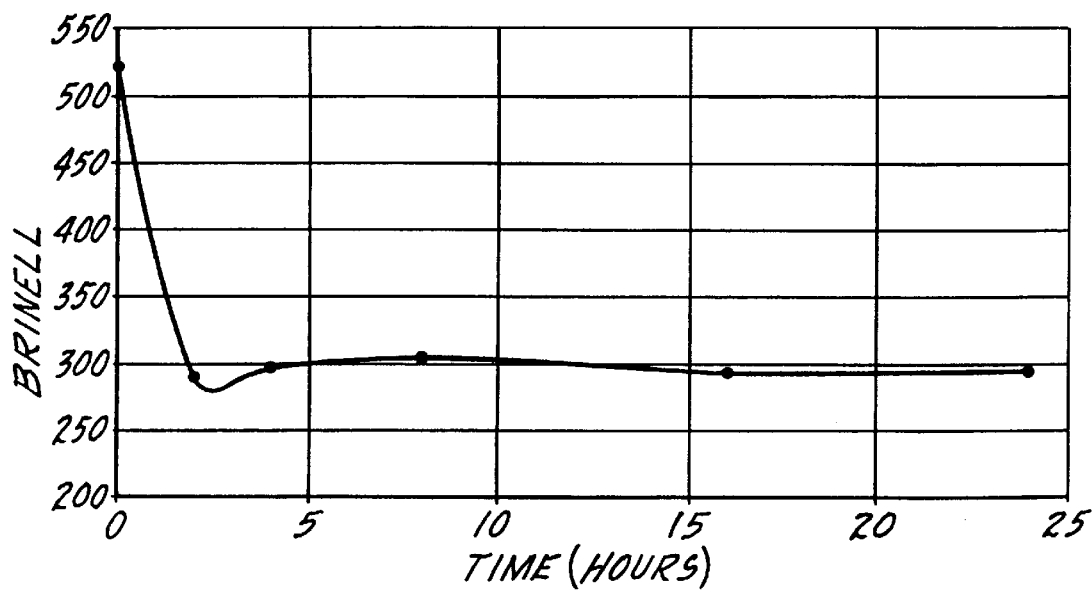
FIG. 3 is a softening resistance graph.

An isothermal hardness vs. time curve at 1300° F. for water quenched tool material from an austenitizing temperature of 1850° F. is illustrated in FIG. 3 to which attention is now directed.

Two sets of room temperature tensile data were gathered in the short transverse plate direction to gauge the strength and ductility of the tool in a spheroidized condition. Yield strength, tensile strength, elongation, and reduction of area data from the tests are listed in Table 10.

TABLE 10

Tensile properties of heat no. 260686 Stresses are in ksi elongation and reduction of area in percent

|  | 0.2% yield stress (ksi) | tensile stress (ksi) | % elongation in 2.0 inch gauge length | % reduction of area in 0.5 inch gauge diameter |
|---|---|---|---|---|
| test 1 | 101.5 | 138.5 | 15.0 | 39.4 |
| test 2 | 102.0 | 140.0 | 15.5 | 36.0 |

Tools 11, 12 and 13, and particularly tool 13, when composed of the constituents as above described, will take and hold a high polish during long production runs with the result that rejections traceable to oxidation on the tool will either be eliminated or drastically reduced to an acceptable level over long production runs.

While a specific embodiment of the present invention has been described, it will at once be apparent to those skilled in the art that variations may be made within the spirit and scope of the present invention. Accordingly, it is intended that the scope of the invention be limited solely by the scope of the hereafter appended claims and not by any specific wording in the foregoing description.

What is claimed is:

1. A glass molding tool for glass forming operations, said tool having a blemish free surface and being a martensitic stainless steel alloy especially adapted for oxidizing environments having (a) high oxidation resistance, (b) high corrosion resistance, (c) good hot workability, (d) high strength and (e) high wear resistance, said tool having the following approximate composition in weight percent: C 0.23–0.38, Mn 0.40–1.00, P 0.040 max, S 0.030 max, Si 0.0–1.20, Ni 1.0–3.0, Cr 14.0–20.0, Mo 0.25–1.00, V 0.10 max, Cu 0.50–1.50, Al 0.030 max, Fe balance including incidental impurities.

2. The glass molding tool of claim 1 further characterized in that the tool has the following approximate composition in weight percent: C 0.28–0.35, Mn 0.40–0.60, P 0.030 max, S 0.010 max, Si 0.20–0.50, Ni 1.50–1.80, Cr 14.0–18.0, Mo 0.35–0.55, V 0.02–0.08, Cu 0.85–1.15, Al 0.02 max, Fe balance including incidental impurities.

3. In a method of producing a glass molding tool for glass molding operations, the steps of forming a melt in an electric furnace, subjecting said melt to a vacuum sufficiently low to decrease the S, H, O and N contents to very low levels, exposing portions of said melt which are remote from the surface to the vacuum by passing a purging gas upwardly through the melt during at least a portion of the time the melt is exposed to said vacuum, further exposing said melt to the heating effect of an alternating current electric heating arc struck directly between said melt and non-consumable electrode means, forming the product of said melt into a tool for glass molding operations, and treating the product of said foregoing processing steps so that the tool is a martensitic stainless steel alloy especially adapted for glass molding operations in oxidizing environments having (a) high oxidation resistance, (b) high corrosion resistance, (c) good hot workability, (d) high strength, (e) high wear resistance, and (e) the following composition in weight percent: C 0.23–0.38, Mn 0.40–1.00, P 0.040 max, S 0.030 max, Si 0.0–1.20, Ni 1.0–3.0, Cr 14.0–20.0, Mo 0.25–1.00, V 0.10 max, Cu 0.50–1.50, Al 0.030 max, Fe balance including incidental impurities.

4. The method of claim 3 further including the steps of solidifying the melt into an electrode following processing of the melt by the vacuum, purging gas and alternating current heating arc, remelting the electrode in a low absolute pressure environment to form an ingot in a cuprous crucible, said ingot having low O, H and N contents and a very low sulphur content.

5. The method of claim 4 further characterized in that the ingot contains less than about 0.005 sulphur.

6. The method of claim 4 further characterized in that the remelting of the electrode occurs under an operating pressure of less than about 100 microns Hg, and said ingot has less than about 1 ppm H, less than about 80 ppm N, less than about 25 ppm O, and less than about 0.003 sulphur.

* * * * *